United States Patent Office 3,809,624
Patented May 7, 1974

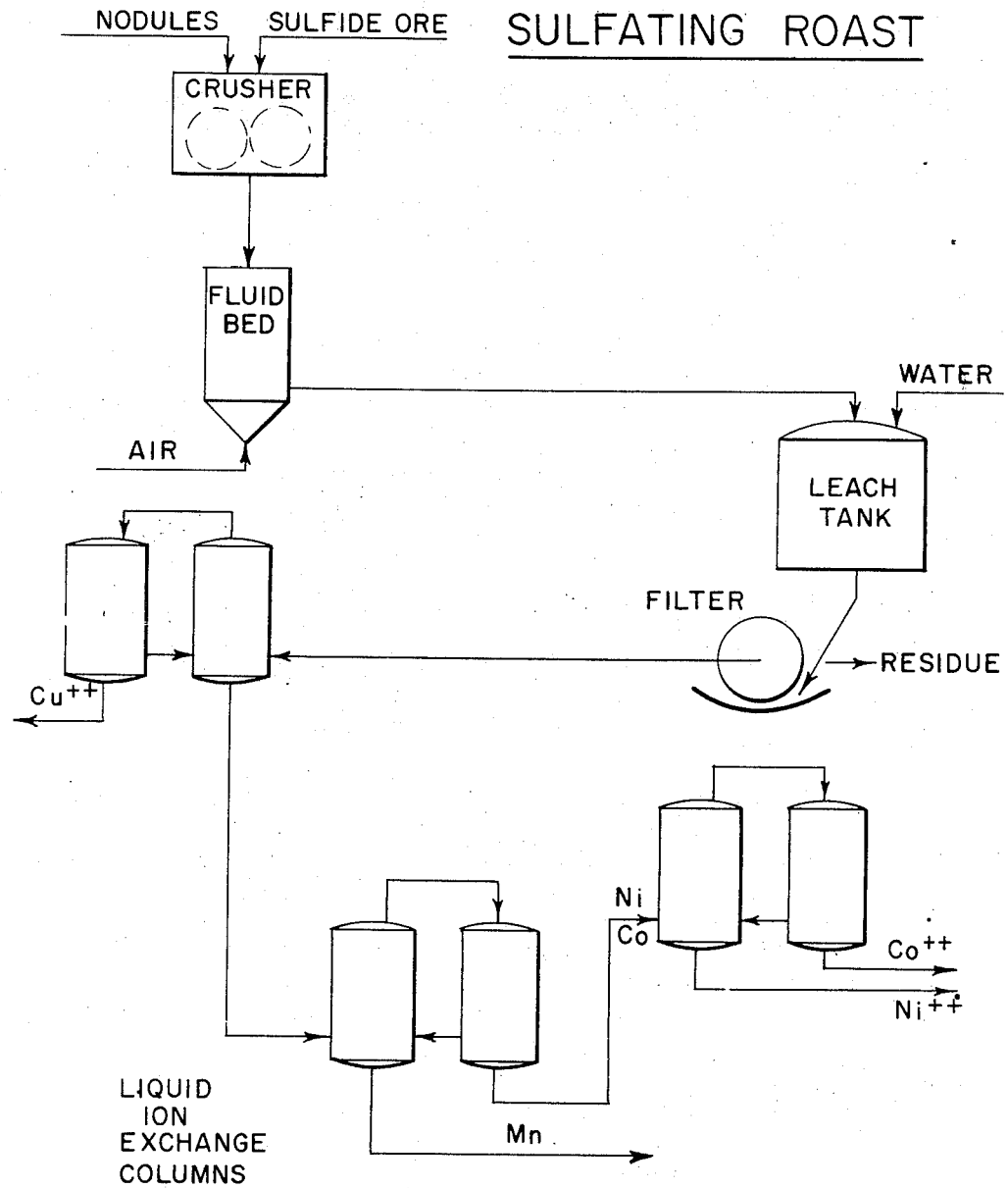

3,809,624
MIXED ORE TREATMENT OF OCEAN FLOOR NODULE ORE AND IRON SULFIDIC LAND BASED ORES
William S. Kane, Wicomic, and Paul H. Cardwell, Zanoni, Va., assignors to Deepsea Ventures, Inc., Gloucester Point, Va.
Continuation-in-part of application Ser. No. 260,344, June 6, 1972, which is a continuation of application Ser. No. 40,496, May 26, 1970, now abandoned. This application Nov. 27, 1972, Ser. No. 309,714
Int. Cl. C22d *1/24, 1/14, 1/16*
U.S. Cl. 204—105 M
15 Claims

ABSTRACT OF THE DISCLOSURE

This invention provides a process for simultaneously obtaining the metal values from ocean floor nodule ore and from an iron sulfide mineral. The nodule ore comprises primarily oxides of iron and manganese plus nickel, copper and cobalt compounds. The ore is reacted with the iron sulfide ore, which may also contain desired non-ferrous metal values at elevated temperatures in the presence of oxygen to form iron oxide and the water-soluble sulfates of the non-ferrous metals. The mixed reacted ores are then leached with water to obtain a solution and the resultant pregnant leach solution is treated, as by liquid ion exchange processes, to obtain separate streams of the individual metal values of nickel, cobalt, copper and manganese. The metals can be obtained by cathodic reduction of the compounds.

---

This application is a continuation-in-part of co-pending U.S. application Ser. No. 260,344, filed June 6, 1972, which in turn was a continuation of U.S. application Ser. No. 40,496, filed on May 26, 1970, now abandoned.

It is not a common situation to obtain a relatively valuable nonferrous metal such as nickel, cobalt, copper, manganese, titanium, indium and zinc, from minerals which contain a relatively high proportion of iron. A relatively untapped source of a high-quality manganiferous ore, however, is a material which is found on the ocean floor and has come to be known as ocean floor nodule ore.

With the increased awareness on the part of both the public and the metals industry of the ecological dangers that can arise from continued surface mining of minerals and the increased problems of pollution caused by the refining procedures required for most ores mined from the land, industry has been interested for several years now in the mining of minerals from the sea. This has been an extremely elusive target up to the present. The directions taken have included both attempts to wrest minerals directly from solution in sea water and the mining of ores which are available on the floor of the ocean. These ores do not require any digging into or stripping of the earth's crust; the ocean floor ores can merely be scooped up or in other ways removed from the ocean floor without actually rending the earth's surface.

Ocean floor nodules were first collected in the first half of the 1870's. They have been studied by many workers in an attempt to determine their composition, and after their composition had been determined to try to decipher ways to wrest from their peculiar structure the valuable metals contained therein. It is presently believed that these nodules are actually creations of the sea; they are somehow grown from the metal compounds which are dissolved in sea water, generally in the form of the metal oxides.

The metal values in the nodules are almost exclusively in the form of the oxides and moreover are present in a very peculiar physical configuration. The physical and chemical structure of the nodules are believed to be a direct result of the conditions under which they were created and to which they have been exposed since their creation. First, the nodules have never been exposed to temperatures other than those at the bottom of the ocean at the location at which they were formed. They have an extremely large surface area, often better than 50% porosity and they are thus relatively chemically reactive ores.

The nodules are formed as an extremely complex crystal matrix of iron and manganese oxides: tiny grains of each oxide of a size and type which are substantially impossible to separate with present available physical means. These iron and manganese oxides form the crystalline structure within which are held, by means not precisely known, other metal compounds, most likely oxides, including those of nickel, copper and cobalt, as the main ingredients, followed by chromium, zinc, tin, vanadium, and many more elements, including the rare metals silver and gold.

In addition to the crystals of compounds of the valuable metals present, there is also a large quantity of silt, or gangue material intimately admixed in the nodule ore. This silt, or gangue, is sand and clay, and includes the usual oxides of silicon and aluminum in varying proportions and some carbonates, especially calcium carbonate.

The precise chemical composition of the nodules varies depending upon their location in the ocean. The variation apparently is caused by differences in temperature in various places, differences in composition of sea water, perhaps caused by the pressure and temperature variations at different depths and composition of adjacent land areas, variations in the amount of oxygen which is present in the water in different locations and perhaps other variables not readily apparent to observers. Generally, however, in almost all cases the metals which are present in primary proportions are manganese and iron. The following table (taken from an article entitled "The Geochemistry of Manganese Nodules and Associated Deposits from the Pacific and Indian Oceans" by Croonan and Tooms in Deep Sea Research (1969), volume 16, pages 335–359, Pergamon Press (Great Britain) shows the relative compositions of the most valuable metals contained in nodules taken from different areas within the Pacific and Indian Oceans.

TABLE I

|    | (1) | (2) | (3) | (4) | (5) | (6) | (7) | (8) | (9) |
|---|---|---|---|---|---|---|---|---|---|
| Mn | 13.96 | 16.87 | 15.71 | 15.85 | 22.33 | 19.31 | 16.61 | 13.56 | 15.83 |
| Fe | 13.10 | 13.30 | 9.06 | 12.22 | 9.44 | 10.20 | 13.92 | 15.75 | 11.31 |
| Ni | 0.393 | 0.564 | 0.956 | 0.348 | 1.080 | 0.961 | 0.433 | 0.322 | 0.512 |
| Co | 1.127 | 0.395 | 0.213 | 0.514 | 0.192 | 0.164 | 0.595 | 0.358 | 0.153 |
| Cu | 0.051 | 0.393 | 0.711 | 0.077 | 0.527 | 0.311 | 0.185 | 0.102 | 0.330 |
| Pb | 0.174 | 0.034 | 0.049 | 0.085 | 0.028 | 0.030 | 0.073 | 0.061 | 0.034 |
| Ba | 0.274 | 0.152 | 0.155 | 0.306 | 0.381 | 0.145 | 0.230 | 0.146 | 0.155 |
| Mo | 0.842 | 0.037 | 0.041 | 0.040 | 0.047 | 0.037 | 0.035 | 0.029 | .031 |
| V  | 0.054 | 0.044 | 0.036 | 0.055 | 0.401 | 0.031 | 0.050 | 0.051 | 0.004 |
| Cr | 0.0011 | 0.0007 | 0.0012 | 0.0051 | 0.0007 | 0.0005 | 0.0007 | 0.0020 | 0.0009 |
| Ti | 0.773 | 0.810 | 0.561 | 0.489 | 0.425 | 0.467 | 0.007 | 0.820 | 0.582 |
| L.O.I | 30.87 | 25.50 | 22.12 | 24.78 | 24.75 | 27.21 | 28.73 | 25.89 | 27.18 |
| Depth (m.) | 1,757 | 5,001 | 5,049 | 1,146 | 4,537 | 4,324 | 3,539 | 3,793 | 5,046 |

1 Mid-Pacific Mountains (5 samples).
2 West Pacific (23 samples).
3 Central Pacific (9 samples).
4 Southern Borderland Seamount Province (5 samples).
5 Northeast Pacific (10 samples).
6 Southeast Pacific (8 samples).
7 South Pacific (11 samples).
8 West Indian Ocean (10 samples).
9 East Indian Ocean (14 samples).

Nodules are also found in the Atlantic Ocean; however, it has been found that generally these nodules contain lower amounts of the more valuable metals and correspondingly high amounts of the less desirable metals which cannot be readily refined and which have little or no value; such as the alkaline earth metals.

Because of the peculiar and intricate crystal structure of the ocean floor nodules, the common refining techniques used for the refining of land ores are not generally suitable for the nodules.

Mero in U.S. Pat. No. 3,169,856 discloses a scheme for "separating the nickel from the cobalt in ocean floor ore deposits." The Mero process is directed to a specific type of ocean floor nodule ore wherein the separate mineral phases of manganese and iron contain different metal constituents. Specifically, according to Mero nickel and copper are present only in the manganese phase of the material whereas cobalt is present solely in the iron phase. Mero further states that the oxides are in solid solution within the nodule. Mero reacts the nodule ore with a strong reducing agent for example, $SO_2$ or $NO_2$.

The Mero process is based upon the unique relationship of the metal constituents in being sub-divided between the manganese and iron phases. Mero states that as a result of the phase differences in the nodule ores, it is possible to carry out a process for differentially leaching these materials from the ore. In a first stage, the ore is contacted with an aqueous solution comprising $SO_2$ or $NO_2$ to selectively leach out manganese, nickel, copper and other mineral elements bound up in the manganese phase of the ore. The cobalt and iron are not leached out. The first solution containing the manganese, nickel and other elements is then treated by various chemical means to separate the different metal values.

Many sulfides iron minerals such as pyrites ($FeS_2$) or pyrrhotite ($Fe_8S_9$) are also extremely difficult to refine so as to obtain the more valuable non-ferrous metal values present. Pyrite ores, for example, often contain in addition to a large proportion of iron and sulfur traces of manganese and copper and pyrrhotite ores often contain in addition to the iron and sulfur: nickel, lead, copper, and cobalt.

Certain low grade silicate nickel ores and slags and other low grade metallurgical materials such as pyrites have apparently been treated in admixture with iron sulfide ores and metal chlorides by roasting in the presence of air. The roasted mixture has then been leached in order to dissolve nickel and cobalt. The products from this procedure are mixtures of sulfate and halide salts of nickel and cobalt together with iron. The nickel and cobalt salts are dissolved in the aqueous solution in admixture with iron and then a series of further treatment steps are undertaken to separate the iron from the more valuable non-ferrous metal values. See for example U.S. Pat. No. 1,410,936.

It has now been determined that by combining an ocean floor nodule ore with an ore containing a large proportion of iron sulfide, a most useful refining process for both ores is obtained, wherein the oxidizing property of the nodule ore and the reducing property of the iron sulfide ore are utilized. The valuable non-ferrous metal values from both ores are obtained as the water soluble sulfates and the iron is in the form of insoluble iron oxide. The process of the present invention provides a simple one-step method by which the iron can be separated from the non-ferrous metals and the non-ferrous metal values can then be readily separated into the individual metal values in order to obtain the desired elemental metals in a pure state.

This invention provides means to refine oxidic ocean floor nodule ore, the ore comprising primary quantities of oxides of manganese and of iron and secondary quantities of compounds of nickel, cobalt and copper. The ocean nodule ore is admixed with an iron sulfide ore which comprises primary quantities of an iron sulfide compound plus secondary quantities of the sulfide of a non-ferrous metal. Examples of non-ferrous metals present in iron sulfide ores include copper, zinc, lead, nickel, cobalt, cadmium, molybdenum, tin, arsenic, antimony, and bismuth. The two ores are treated together by a process comprising: (1) admixing and roasting the two ores in the presence of oxygen at a temperature sufficient to convert any iron sulfide present in the sulfide ore to iron oxide and to convert the remaining sulfides and oxides to sulfates, (2) leaching the roasted mixed ore with water so as to obtain an aqueous solution of the soluble sulfates of the metal values obtained from the sulfide ore, e.g., copper, lead or nickel and the soluble sulfates of manganese, nickel, cobalt and copper, the metal values obtained from the nodule ore and (3) separating the aqueous solution from any insoluble residue from the ores.

The aqueous solution of the mixed soluble sulfate salts can then be further refined to obtain the individual metal values which can then be reduced as desired to form the elemental metals. Preferably, the desired metal values are separated by individually extracting each metal from the solution in seriatum and then treating the individual metal values in a known manner to obtain the elemental metal. In a preferred embodiment, the aqueous solution is contacted with a liquid ion exchange medium capable of selectively extracting one of the metal values from the solution. The liquid ion exchange medium is separated from the aqueous solution raffinate and the metal value then stripped from the liquid ion exchange medium to form an aqueous solution of the separated metal value. The individual metal value can then be reduced by known means, for example, electrolyzing the aqueous solution of the individual metal value, or evaporating the aqueous solution to obtain the solid salt and reducing the pure, solid salt by fused salt electrolysis, or by cementing from aqueous solution, with another metal or with hydrogen gas.

Preferably, both the ocean floor nodule ore and the sulfide iron ore are comminuted, as in a crusher or grinder, to a particle size of not greater than about 10 mesh on the U.S. sieve scale and preferably in the range of from about 25 to about 100 mesh. The two ores can be crushed or ground together or mixed after they are comminuted. As complete mixing as possible is desirable and for that reason grinding or crushing the two ores together does aid in forming a fairly uniform mixture of the two. Even better mixing is of course obtained when a fluidized reactor bed is used for the roasting. The air blow supporting the fluidation tends to form an extremely uniform mixture of the two ores.

Preferably, the roasting is carried out at a temperature of at least about 350° C. and generally, not greater than about 600° C. Optimally the reaction is carried out at a temperature in the range of from about 400 to about 600° C.

The pressure in the reactor does not affect the chemistry of the reaction. If a fluidized bed is used, the pressure requirement is that sufficient to maintain the bed fluid. In a non-fluid bed, substantially ambient or slightly above ambient pressure can be utilized in order to maintain the flow of air through the bed.

When utilizing air to maintain a fluidized bed, sufficient oxygen is provided to the ore particles to sustain the desired reaction. Generally, at least a stoichiometric amount of oxygen, preferably as air, should be provided, but a substantial excess of air is preferably provided. When operating in a fluidized bed using air as the fluidizing medium, a large excess of air is present to insure complete reaction of all the metal values to form the desired soluble sulfate salts.

The two ores can be generally mixed in substantially equivalent proportions depending upon the relative amounts of sulfur and metal values in each of two ores. The most efficient results, of course, would be obtained by utilizing a stoichiometric quantity of the two ores; however, as this is practically difficult to achieve, it is preferred that there be a slight excess of the iron sulfide ore in the reactor to insure complete reaction of the more valuable ocean floor nodule ore.

The reacted mixed ores can then be leached with water by conventional leaching procedures, utilizing conventional leaching equipment for liquid-solid contact. The leach water should have a pH of not greater than about 3 and preferably not less than about 2. The leaching with water can be carried out at substantially ambient temperatures. However, as the reactor ore is hot, the leaching is done at, initially, at least higher temperatures below the boiling point of water. Leaching, generally, can be done at temperatures of from about 0 to about 100° C., preferably at from about 10 to about 75° C., and optimally at from about 25 to about 60° C.

The amount of leach water required generally should be sufficient to dissolve all of the metal values present in both ores. The contact can occur in a single stage, but, preferably, occurs in several stages, as in a mixer-settler system. However, the design of such equipment is known to the art and does not constitute a feature of this invention.

The pregnant leach solution can be separated from the remaining solid residue and finally filtered to insure complete removal of all particulate solid matter. The solid residue from the leaching includes the iron oxide and gangue, or insoluble residue, from the ore.

The pregnant leach solution containing the dissolved soluble metals from the two ores can be separated from the insoluble solids by any conventional liquid-solid separation procedure, e.g., filtering, decanting, thickening, etc. The leaching and solid-liquid separation can be carried out batch-wise or continuously, but preferably by continuous countercurrent flow.

It is important that all the iron be converted to the oxide and thus not dissolved by the pregnant leach solution. Iron tends to interfere with the preferred methods for separating and purifying the individual metal values remaining in the pregnant leach solution.

The pregnant leach solution obtained following the leaching contains generally up to about 110 grams/liter of manganese value, but preferably contains manganese in a concentration of at least about 25 gms./l. of metal, and optimally in a concentration of about 25 to about 100 gms./l. The concentration of the other metals in the leach solution are proportional to their concentration in the two ores relative to manganese. Generally, the manganese salt has the limiting solubility so that substantially all of the remaining metal values can be leached out with manganese. This is especially true with regard to nickel, cobalt and copper.

Because of the rather complex mixture of materials which are obtained from such ocean floor nodules especially when mixed with the metals from the sulfide ore, many of the standard hydrometallurgical methods for separating out metal values are not directly applicable because of the presence of various interfering ions. Preferably, the following procedures can be utilized for separating at least the pure cobalt, copper, nickel, and manganese metal values from the pregnant leach solution.

For separating each of the copper, cobalt, and nickel values from the leach solution a liquid extraction procedure is most preferred.

The liquid-liquid extraction procedure requires the use of an extracting medium which is readily separable from water, which is selective for extracting one or more of the metal values from the aqueous leach solution and from which the metal value can be readily stripped.

The extracting medium should be immiscible with water to improve the economic efficiency of the process. If the extracting medium were not immiscible with water, a substantial loss of the extracting reagent would occur during each extraction, by virtue of at least a partial solubility in the water phase and a loss of the extracting agent in the aqueous raffinate.

Extracting agents which are especially suitable because they are highly specific to the metal values in the leach solutions which are obtained, e.g. from ocean floor nodule ores, include, for example, certain substituted 8-hydroxyquinolines, α-hydroxy oximes and naphthenic acids.

The 8-hydroxyquinoline compounds, which are especially useful for the separation of the metal values in accordance with the present process, can generally be defined by the following formula:

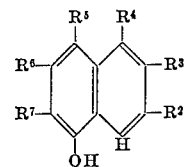

wherein each of the R groups can be hydrogen or a hydrocarbyl group or inertly-substituted hydrocarbon groups, such as alkenyl, alkyl, alkynyl, cycloalkyl, cycloalkenyl, aryl or combinations thereof, such as alkaryl, aralkyl, aralkenyl, alkyl-cycloalkyl, etc.

At least one of the R groups, however, must be a hydrocarbon group. Any inert substituent can be present as long as it does not adversely affect the solubility of the substituted 8-hydroxyquinolines in organic solvents nor adversely affect the solubility in the organic solvent of the metal chelate formed therefrom.

The resulting metal chelate must remain soluble at least to the extent of approximately 2% by weight in the organic solvent.

The preferred position of the hydrocarbyl substituent of the 8-hydroxyquinoline nuclear structure is such as to preferentially complex with the desired metal ion in the aqueous solution. The sum of the carbon atoms in the R groups must be at least about 8 and can be as high as 24 or more. The preferred R groups are alkylbenzyl groups or beta-alkenyl groups containing from 12 to 18 carbon atoms, preferably attached at the $R^5$, $R^6$, or $R^7$ position. The optimum position for substitution is at the $R^7$ position to obtain the higest degree of efficiency. For a more complete description of these hydrocarbyl-substituted 8-hydroxyquinolines, see Republic of South Africa specification No. 69/4,397 to Budde Jr. et al., assigned to Ashland Oil, Inc.

Representative compounds useful for ion exchange and within the scope of the above General Formula I are: 7-octyl-benzyl-8-hydroxyquinoline, 7-dodecyl-benzyl - 8 - hydroxyquinoline, 7-nonylbenzyl-8-hydroxyquinoline, 7-ditertiarybutyl-benzyl-8-hydroxyquinoline, 7 - hexadecenyl-8-hydroxyquinoline, 7-dibenzyl - 8 - hydroxyquinoline, 7-dimethyldicyclopentadienyl - 8 - hydroxyquinoline, 7-phenyl-dodecenyl-8-hydroxyquinoline, and the like where one or more of the hydrocarbyl groups R are attached to ring carbon atoms in the 2nd, 3rd, 4th, 5th and 6th positions. Mixtures of these 8-hydroxyquinoline derivatives can be used if desired.

The second preferred type of metal extractants are the alphahydroxy oximes, which are disclosed inter alia in U.S. Pats. Nos. 3,224,873; 3,276,863 and 3,479,378. These materials have the general formula:

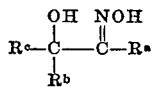

wherein the $R^a$, $R^b$ and $R^c$ groups can be any of a variety of organic, hydrocarbon radicals such as aliphatic and alkyl aryl radicals. $R^b$ can also be hydrogen. Preferably $R^a$ and $R^c$ are unsaturated hydrocarbon or branched chain alkyl groups containing from about 6 to about 20 carbon atoms. $R^a$ and $R^c$ are also preferably the same, but when alkyl are preferably linked to the central carbon atoms by a secondary carbon atom. $R^b$ is preferably hydrogen or unsaturated hydrocarbon or branched chain alkyl group containing from about 6 to about 20 carbon atoms. The oxime preferably contains a total of from about 14 to about 40 carbon atoms. Useful $R^a$, $R^b$ and $R^c$ groups include in addition to hydrogen, the mono- and polyunsaturated groups such as heptenyl, octenyl, decenyl, octadecenyl, octadecynyl, and 2-ethyl-octadecenyl.

Alkyl groups include 2-ethylhexyl, 2,3-diethylheptyl, 2-butyldecyl, 2-butylhexadecyl, 2,4-ethylbutyldodecyl, 4-butylcyclohexyl, and the like. Examples of the preferred alpha-hydroxy oximes include 19-hydroxyhexatriaconta-9,27-dien-18-oxime; 5,10-diethyl-8-hydroxytetradecan - 7-oxime; 5,8-diethyl-7-hydroxydodecane-6-oxime.

The liquid ion exchange agents, which are used for the extraction of copper, cobalt and nickel values are generally chelates and thus remove only the metal values from the solution, leaving behind the anions.

The above hydroxyquinolines and oximes are compounds generally known to industry and commercially available. Any other compounds useful as selective extractants for the metal values in the aqueous systems obtained from the reduction of ocean floor nodules ores can also be used in the process of this invention.

The extracting agent can be a liquid which is itself water-immiscible but generally can be dissolved in a solvent which is substantially immiscible with water. The oximes and hydroxyquinolines are at least partially insoluble in water. It has been found to be preferable to use them in solution in a water-immiscible solvent to form a water-immiscible extraction medium to prevent loss of the extraction agent in the aqueous raffinate.

It has been found when utilizing common commercially available water-immiscible solvents that solutions containing from about 2 to about 50 percent by wt. and preferably from about 5 to about 30 percent by wt. of the extracting agent are economically useful as being sufficiently active to remove the desired metal values selectively from the aqueous solution and being sufficiently dilute in the extracting agent so that substantially no extracting agent is leached out and lost in the aqueous raffinate. If it is desired, however, more concentrated solutions can be utilized. Mixtures of extracting agents can be used as long as they are not jointly reactive and do not interfere with the process of this invention.

Useful solvents include generally any inert hydrocarbons which are solvents for the extracting agent, per se, and for the metal chelate, or, extracting agent-metal complex, and which do not react with any of the other materials present, under the conditions of the extraction process. Generally, liquid aliphatic, cycloaliphatic, aromatic, cycloaliphatic-aromatic, aliphatic-aromatic or chlorinated such hydrocarbons are preferably utilized as the solvent-diluent for the extracting agent. Optimally, the diluent-solvent has a specific gravity in the range of from about 0.65 to about 0.95 and a mid-boiling point in the range of from about 120 to about 615° F. (ASTM distillation). However, substantially any liquid can be used as a solvent-diluent that meets the following criteria:

(1) A solvent for the extracting agent;
(2) A solvent for the extracting agent-metal complex, or chelate;
(3) Immiscible with water; and
(4) Readily separable from water.

Examples of suitable solvents include benzene, toluene, xylene, aliphatic and aromatic petroleum fractions such as naphtha and derivatives thereof and mixtures of the foregoing. In addition to the aliphatic, aromatic, cycloaliphatic-aromatic, aliphatic-aromatic hydrocarbons and cycloaliphatic hydrocarbons, chlorinated such hydrocarbon liquids can also be usefully utilized.

Light fuel oil, high flash point kerosene and other petroleum hydrocarbons, such as hexane-heptane mixtures are preferred. Generally, the aliphatic materials are most preferred because of their ready availability and ease of separation from the aqueous phase.

The concentration of the extracting agent in the solvent-diluent is determined not only by the solubility of the extracting agent per se, but also by the solubility of the extracting agent-metal complex, or chelate.

In addition to the diluent and the extracting agent, there can preferably also be present in the liquid extracting medium a phase modifier which prevents formation of an emulsion with, or entrainment of, the organic phase in the aqueous phase. This is accomplished, it is believed, by altering the surface tension and related physical properties of the organic-aqueous mixture during extraction. These phase modifiers are generally most useful when an aliphatic solvent-diluent is utilized and include, preferably, aliphatic alcohols containing from about 8 to about 16 carbon atoms such as n-octyl alcohol, n-decyl alcohol, n-dodecyl alcohol, n-tetradecyl alcohol, n-hexadecyl alcohol, isooctyl alcohol, 2-ethylhexyl alcohol, cyclohexanol and mixtures of these and other alcohols. Decanol is a preferred material.

Generally no more than the necessary amount of the phase modifier, e.g., alcohol, which is necessary to inhibit the formation of the emulsion or prevent entrainment, should be used. Usually no more than about 25% by volume of the phase modifier is necessary. Preferably, from about 2 to about 10% by volume is satisfactory and not more than about 5% is most preferred. The phase modifier can be completely eliminated if desired, and, therefore, is optional in the present procedure.

The present invention does not comprise solely the selection of the extracting medium. It is preferred that the extracting medium be a liquid, because liquid-liquid extraction of a normally solid material from solution is a relatively simple and common procedure. However, other extraction procedures can be followed and other types of extractants used.

When utilizing liquid-liquid extraction from an aqueous solution of mixed metal halides, a wide range of aqueous phase-to-aqueous-immiscible-phase volume ratios can be utilized in the present invention. Generally, using a 20% by wt. solution of the extracting agent, aqueous-to-aqueous-immiscible phase volume ratios of from about 10:1 to about 1:10 are desirable. The useful range of volume ratios differ proportionately for other concentrations of the extracting agent.

The above two types of extraction agents are especially preferred for the separation of the metal values found in the leach liquid obtained from ocean floor nodules because it has been discovered, as an aspect of this invention, but a single one of these reagents can be utilized for the selective removal of all of the important metal values from the leach liquid. Thus, by utilizing either an $\alpha$-hydroxy oxime or an 8-hydroxyquinoline, a single extracting medium can be utilized for removing, in seriatim, all of the desired metal values. It is unnecessary to utilize a multiple extractant system when utilizing these materials, but is merely necessary to vary the pH of the leach solution following each successive extraction.

Beginning with a pregnant leach solution containing dissolved copper salt, cobalt salt, nickel salt and manganese salt, as the primary solutes, plus a variety of other metal salts in minor concentrations, the extraction of the individual metals can preferably be carried out by the following general procedure with liquid ion exchange agents: (1) adjust the pH of the pregnant leach solution to a desirable pH, (2) mix the pregnant leach solution with an immiscible organic liquid containing an extractant specific to a metal at that pH; preferably, copper is extracted with an $\alpha$-hydroxyoxime or 8-hydroxyquinoline initially at a pH of not greater than about 2.5, preferably from about 1.5 to about 2.5 and optimally of from about 1.8 to 2.2; the best results are obtained at a pH of about 2; (3) separate the aqueous raffinate from step (2), adjust the pH as necessary, mix the raffinate with an immiscible organic liquid containing an extractant specific to another metal at the pH of the aqueous phase. Generally, nickel can be extracted using for example an $\alpha$-hydroxyoxime or 8-hydroxyquinoline at a pH of from about 3 to about 6 and preferably about 3 to about 3.5 with chelating, or liquid ion exchange agents, and cobalt can be extracted at a pH of from about 3.5 to about 7, preferably from about 6, optimally from 3.5 to about 5 and the most economical results at from 3.5 to about 4.5. At too high a pH, the manganese, nickel and cobalt tend to precipitate and this is preferably avoided. Further, increasing pH too much is expensive, in using up basic reagents. Nickel and cobalt can be extracted together.

The ratio of cobalt and nickel removed from the pregnant leach solution by the extractant is determined by the pH, and by the volume phase ratio of organic-to-aqueous phases, i.e., the relative proportions of nickel and cobalt can be the same as that which is present in the pregnant leach solution or it can have a greater proportion of nickel or a greater proportion of cobalt. Generally, the higher the pH the greater the proportion of cobalt extracted. It is preferred, usually, to remove the nickel and cobalt in the same proportions as the metals are present in the pregnant leach solution. Therefore, the pH for this ratio should be maintained during the extraction.

It is usually necessary to continually add alkaline material during the extraction stages in order to maintain the desired pH. The chelating agents act by releasing hydrogen ions when extracting metals, and thus the pH would decrease during extraction. Caustic soda solution is preferably used. The sodium ion generally does not interfere with the further processing of any metal salt. However, other useful basic materials include generally the oxides, hydroxides and carbonates of alkali metals and alkaline earth metals. Such compounds include potassium hydroxide, lithium hydroxide, lithium carbonate and ammonium hydroxide and carbonate. Manganese hydroxide and manganese carbonate are especially useful as they do not introduce any additional metal value. Buffering agents can also be added; however, this can add an undesirable impurity to the leach liquid.

Each extraction step can be carried out with one or more extraction stages until the desired amount of metal is extracted.

(4) The metal-containing organic extractant phases can be stripped of the metal values by contacting with aqueous stripping solution; generally an acidic solution is used. Generally, following stripping the extracting solution can be recycled to the process.

Copper can be readily stripped by any aqueous mineral acid. The amount of hydrogen ion provided by the stripping liquid must be at least slightly in excess (preferably at least about 5% in excess) of the stoichiometric amount needed to substitute for the metal in the extract. Preferably the stripped copper is soluble in the stripping liquid. The preferred stripping acids include sulfuric acid, nitric acid, and hydrochloric acid. As the acid used determines the metal salt to be formed, this can be a basis for selecting the acid, if a particular salt is desired.

Where nickel and cobalt are extracted together, the nickel can first be stripped using a relatively weakly acidic aqueous solution, such as the mineral acids or the stronger organic acids, such as chloracetic acid, in a concentration of less than about 6 N, preferably from about 0.01 N to about 3 N acid and most preferably from about 0.1 N to about 1.0 N. Cobalt can then be stripped from the chelate using a strong mineral acid aqueous solution in a concentration of at least 6 N hydrogen ion and 6 N chloride ion. Strong hydrochloric acid, containing at least about 20% by weight HCl is preferred.

Although the strong acid-chloride solution of cobalt can be directly used for the further reduction to cobalt metal, as in an aqueous electrolysis cell, it is preferred to extract the cobalt and then strip again to permit recycling and further use of the relatively expensive, strong, 6 N acid-chloride solution. This can be done by contacting the cobalt solution with a tri-alkyl amine, or other material capable of extracting cobalt from an aqueous solution. The amine is preferably dissolved in a water-immiscible solvent to form a solution of the type described above for use with the hydroxyquinolines and oximes.

The tri-alkyl amine solution forms a complex with the cobalt halide and can then be readily separated from the strong acid solution. The cobalt halide can be stripped from the extractant by a weakly acidic aqueous solution, i.e., a pH of not greater than about 3, which can then be used, for example, as an aqueous electrolyte for refining to the elemental metal by cathodic electroplating.

The aqueous raffinate leach solution remaining after the cobalt and nickel are removed contains substantially all of the manganese value which was leached from the nodule plus any non-ferrous metals from the sulfide ore, plus minor amounts of the salts of other metals from the nodule ore.

In order to obtain a sufficiently pure stream of manganese salt, it is advisable to separate the other metals from the manganese. This can be done in various ways: "cementation," passing the solution through a bed of manganese metal particles, which results in the removal of the more noble metals by substitution therefore by manganese, or precipitation, as by sulfide precipitation of the other metals present. The remaining manganese sulfate in solution can then be utilized for the preparation of manganese metal by any conventional means. The presence of alkali or alkaline earth metals results in no interference at this point.

The solutions of the individual metal salts can then be treated in a conventional manner to reduce them to the elemental metals, e.g., by cathodic electroplating techniques. For example, manganese sulfate can be reduced to manganese in an aqueous electrolytic cell. Copper, nickel and cobalt salts can be reduced to the metal from aqueous solutions in electrolytic cells.

The electrolytic procedures include the conventional methods for electrolytically reducing the salts to the elemental metals and the exact procedure forms no part of this invention. However, preferably, aqueous electrolysis procedures are followed wherein the electrolysis solution can be utilized in stripping the metal value from the liquid ion exchange medium and then can be reused directly, with or without preliminary treatment, in the electrolysis, so as to continuously replenish the supply of electrolyte salt.

It should be noted that under this procedure the electrolyte salt, which is obtained from the liquid ion exchange medium, need not be the original sulfate produced in the reduction reaction.

Generally, it has been found that the halides of cobalt and nickel are especially effective as electrolyte solutes producing an elemental halogen, e.g., chlorine, in addition to the elemental metal.

Although the initial product formed during the reaction between the nodules and the reducing gas are sulfate salts when the metal values are stripped from the liquid ion exchange medium the salt formed depends upon the acid which is used for the stripping.

For a more complete explanation and description of various electrolysis, or cathodic electroplating, refining procedures, see Graham Electroplating and Engineering Handbook (1971), for example.

The process of the present invention therefore provides a method by which the desired valuable non-ferrous metal values can be obtained from both ocean floor nodule ore, which is an ore primarily oxidic, and difficult to refine iron sulfide ores. The reactions which occur in the roasting of the two ores using, for example, pyrite ore and pyrrhotite ore as the sulfidic ores, are substantially as follows:

(A) Pyrite

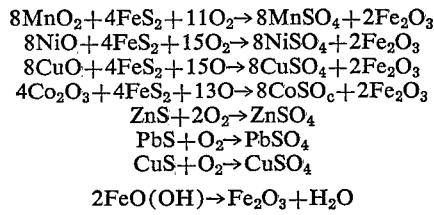

$$2FeO(OH) \rightarrow Fe_2O_3 + H_2O$$

(B) Pyrrhotite

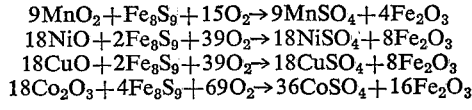

$$2FeO(OH) \rightarrow -Fe_2O_3 + H_2O$$

The drawing accompanying this application is a schematic flow diagram of a procedure wherein the mixture of ores is roasted, leached, and the solution obtained therefrom separated by liquid ion exchange into the respective individual metal values.

Referring to the drawing the iron sulfide ore and the nodule ore are mixed together and simultaneously crushed to a particle size of about 35 to 100 mesh. They are then passed to a fluidized bed reactor wherein air, blowing upwardly through the bed, maintains the particulate ores in a fluidized condition. The fluid bed is maintained at a temperature of at least about 400° C. The ores are removed from the fluid bed and passed to a leach tank where it is contacted with water having a pH of about 2. The mixture of the ore and water is filtered to separate the solid residue which is discarded. The pregnant leach solution comprises the sulfates of manganese, nickel, copper, and cobalt from the nodule ore and usually some non-ferrous metal sulfates, such as copper sulfate and nickel sulfate, from the iron sulfide ore. It is substantially free of iron value. The pregnant leach solution is then passed to a liquid ion exchange system to separate out the individual values.

The pregnant leach solution filtrate is extracted with a liquid ion exchange agent specific to copper at the pH of the filtrate, approximately 2.0. The liquid ion exchange reagent, e.g., an oxime or an 8-hydroxyquinoline, is dissolved in organic solvent medium which is immiscible with the aqueous leach solution. The extractant solution and leach solution are contacted in any conventional liquid-liquid extraction equipment. Preferably a multi-stage counter-current flow extraction is carried out, either in multiple mixer-settler stages or in an extraction column. The aqueous raffinate from the final stage is substantially depleted of copper.

The organic extract phase is stripped of its copper by contact with a sulfuric acid solution having a hydrogen ion concentration of about 2 N to about 6 N, in this case recycled from the copper electrolytic cell. The copper is stripped out as copper sulfate, which can be directly fed to the electrolytic cell. The organic extracting solution is then recycled.

To the aqueous raffinate is then added an alkaline material to increase the pH to the desired value, about 3.5. The raffinate is then extracted again with a liquid ion exchange agent, such as an α-hydroxy oxime or an 8-hydroxyquinoline in 5–25 percent by volume solution.

The pH of the aqueous phase is monitored and maintained at the necessary pH (4.2 for oximes or hydroxyquinolines) until most of the nickel is extracted, and the pH is then increased to at least 3.5, and preferably kept in the range of 3.5 to 4.5 until the remaining cobalt is extracted. The organic extract phase from the extraction system contains the cobalt and nickel, and the final raffinate aqueous phase is substantially depleted of these metals, and contains primarily manganese sulfate and small quantities of the other non-ferrous metal sulfates originally present.

Alternatively, all of the nickel and cobalt can be removed in a single unit by maintaining the pH of the aqueous phase constant during this extraction such that the ratio of nickel-to-cobalt which is extracted is substantially that in the pregnant leach solution. This can be predetermined and the pH of the aqueous phase maintained to correspond to this proportion by continuously adding basic material during the extraction. Generally, the higher the pH the greater the proportion of cobalt which is extracted relative to the nickel, and vice versa.

The organic extract, which contains cobalt and nickel, is then stripped first of its nickel content using the aqueous salt solution from a nickel electrolysis cell. To this solution is added sufficient make-up sulfuric acid to increase hydrogen ion concentration to a degree sufficient to at least stoichiometrically replace the nickel from the extract; generally from about 2 N to about 3 N hydrogen ion concentration is preferred. This is sufficient to strip out nickel without removing cobalt. The aqueous phase containing nickel is then fed to the nickel electrolytic cell.

The remaining organic phase layer is then further treated with a very strong aqueous solution of HCl containing at least 6 N hydrogen ion concentration and 6 N chloride ion concentration, e.g., at least 18% HCl. It is necessary that there be a sufficiently high chloride ion concentration to form the tetrachlorocobalt complex, which it is believed is needed in order to strip out cobalt. Although hydrochloric acid is preferred, as this provides both the necessary hydrogen concentration and chloride concentration, other strong mineral acids can be utilized in combination with soluble halide salts. The strongly acidic aqueous solution containing cobalt as the only metal can then be contacted with a 5–30% solution of an organic tertiary amine, e.g., tri-2-ethylhexyl amine, to extract cobalt. The cobalt can be readily stripped from the amine solution using the electrolyte solution from a cobalt cell, and the aqueous stripping phase fed directly to the electrolysis cell. The 6 N HCl solution can then be recycled.

The nickel sulfate and cobalt chloride solutions are electrolyzed in aqueous electroplating cells of conventional type. The electrolysis solutions are continuously recycled as a stripping liquid to pick up make-up metal salt from the cells.

The raffinate from the cobalt-nickel extraction is then passed over manganese metal to cement out the more noble non-ferrous metals present in the raffinate. The solution of manganese sulfate can next be reduced to manganese in an aqueous electrolysis cell.

The following examples set forth preferred embodiments of the present invention but are exemplary and not exclusive of the full range of this invention.

EXAMPLE 1

Ocean Floor Nodules Ore was obtained having the following composition:

| Component: | Percent by wt. |
|---|---|
| Manganese | 17.65 |
| Iron | 10.6 |
| Nickel | 0.65 |
| Cobalt | 0.32 |
| Copper | 0.12 |
| Other metals | Traces |

A pyrrhotite ore derived from the Great Gossan Lead Deposit in Carroll County, Virginia, was concentrated by flotation, to a material having the following composition:

| Component: | Parts by wt. |
|---|---|
| Iron | 48.27 |
| Sulfur | 36.38 |
| Manganese | 0.30 |
| Copper | 0.54 |
| Cobalt | 0.04 |

A sample of 7.04 gms. of nodule ore and 8.45 gms. of pyrrhotite ore was ground to an average particle size of less than 50 mesh and was placed in a roasting furnace subject to an air flow of about 0.5 liter per minute at a temperature of 450° C. for a period of 15 hours.

The flow of air was stopped and the heat removed: the mixed reacted ore was then permitted to cool to a temperature of about 20° C., and leached with water having a pH of about 2.

The water and ore were passed countercurrently through three mixer-settler stages. The pregnant leach solution was analyzed and it was found that the following percentages of metal values originally in the ores were dissolved in the pregnant leach solution:

| Metal: | Percent by wt. dissolved |
|---|---|
| Manganese | 100 |
| Nickel | 78 |
| Cobalt | 100 |
| Copper | 79 |

The pH of the aqueous pregnant leach solution was adjusted to 2. The leach solution was treated by liquid ion exchange means to separate out the individual metal values of copper, nickel and cobalt from the manganese.

The aqueous pregnant leach solution contained manganese sulfate, copper sulfate, nickel sulfate and cobalt sulfate in solution. This solution was extracted utilizing a solution comprising 10% by volume of an alpha-hydroxyoxime (5,8-diethyl-7-hydroxy dodecane - 6 - oxime, known as LIX-64N), 20% by vol. isodecanol, and the balance is mixed hydrocarbon solvent, comprising mixed aromatic-aliphatic petroleum hydrocarbons having a boiling point range of 410–460° F. and a specific gravity of 0.81.

The pH was maintained at about 2 by the addition of caustic during the extraction of copper. The aqueous raffinate and organic extractant passed countercurrently through five mixer-settler stages at an organic-to-aqueous ratio of 1:1 by volume. The aqueous raffinate from the copper extraction contained substantially all of the manganese, nickel, and cobalt originally present but substantially all of the copper had been extracted.

Following the separation from the final settling stage, the organic extract was stripped of copper by spent acid solution from a copper aqueous electrolysis cell having a hydrogen ion concentration of 3 N, utilizing countercurrent flow through 5 stages of a mixer-settler series.

The aqueous raffinate from the copper extraction step was adjusted to a pH about 4.5 by the addition of 2 N caustic solution. The resulting aqueous solution was extracted in a five-stage mixer-settler system, with a solution of 10% by volume 7-(3-(5,5,7,7-tetramethyl - 1 - octenyl))-8-hydroxyquinoline plus 20% by volume isodecanol in kerosene to extract nickel and cobalt.

The nickel was stripped from the organic extract phase using the spent solution from a nickel electrolysis cell to which sulfuric acid was added to a concentration of hydrogen ion of 3 N in order to insure stripping of all of the nickel. The organic liquid and stripping acid were passed countercurrently through 3 mixer-settler stages at an organic-to-aqueous liquid ratio of 3:1, by volume. Substantially all of the nickel was removed from the organic phase.

The cobalt was next stripped from organic extract phase utilizing an aqueous solution containing 20% by wt. HCl, in four mixer-settler stages at an organic aqueous ratio of 3:1. The cobalt was extracted from the 20% HCl solution using a kerosene solution containing 10% by volume triisooctyl amine (TIOA), in three mixer-settler stages at an organic:aqueous volume ratio of 2:1. The cobalt was stripped from the TIOA solution utilizing agent aqueous electrolyte from a cobalt electrolysis cell in 3 mixer-settler stages with a 1:2 organic:aqueous phase ratio.

The raffinate from the cobalt-nickel extraction contained primarily manganese sulfate. Hydrogen sulfide was passed through the raffinate to precipitate the various other metal values present, leaving a substantially pure solution of manganese sulfate.

There were thus obtained, as a result of this process, four separate final streams each containing substantially pure metal salt: copper sulfate, nickel sulfate, cobalt chloride and manganese sulfate. Each of these aqueous solutions could be further treated by known methods to reduce the salts to the respective elemental metal, as in aqueous electrolytic cells.

EXAMPLE 2

The procedure of Example 1 was repeated, but substituting for the ore, a pyrite ore having the following composition:

| Component: | Percent by wt. |
|---|---|
| Iron | 46.5 |
| Sulfur | 53.5 |
| Manganese | Trace |
| Copper | Trace |

The mixed roasted ores were leached as in Example 1 and a solution containing the following proportions of the total metal values present in the two ores was obtained:

| Metal: | Percent dissolved in solution |
|---|---|
| Manganese | 100 |
| Nickel | 91 |
| Cobalt | 100 |
| Copper | 100 |

The procedure for this example was varied only in that the roasting temperature was 400° C. rather than 450° C.

EXAMPLE 3

The procedure of Example 1 was repeated but substituting an iron sulfide ore having the following composition:

| Component: | Percent by wt. |
|---|---|
| Nickel | 3.46 |
| Copper | 0.32 |
| Cobalt | 0.14 |
| Manganese | Trace |
| Iron | 58.4 |
| Sulfur | 37.7 |

The resultant pregnant leach solution contained the following percentages of the metals present in the ores:

| Metal | Percent dissolved in solution (by wt.) |
|---|---|
| Nickel | 78 |
| Copper | 78 |
| Cobalt | 100 |
| Manganese | 100 |

The patentable embodiments of this invention which are claimed are as follows:

1. A process for separating metal values simultaneously from an ocean floor nodule ore and from an iron sulfide land-based ore, the nodule ore comprising as primary components, the oxides of manganese and iron and as secondary components, compounds of copper, cobalt and nickel and iron sulfide ore comprising as a primary component a sulfide of iron and as a secondary component a sulfide of a non-ferrous metal, the process comprising the steps of (1) mixing the nodule ore and the sulfide iron ore; (2) roasting the mixed ore in the presence of oxygen so as to form as reaction products the water-soluble sulfate salts of divalent manganese, nickel, cobalt and copper and of the non-ferrous metal present in the sulfide ore and an insoluble iron compound; (3) leaching the reacted mixed ores with water to form an aqueous pregnant leach solution comprising the water-soluble sulfate salts of the metals present in the sulfide ore and the nodule ore; (4) separating the pregnant leach solution from any insoluble residue of the ores, including the insoluble iron compound, to form an aqueous solution of the mixed soluble sulfate salts; (5) separating out an individual metal value by selectively extracting the metal value from the aqueous solution to form a solution of the individual metal value in the form of a water soluble salt; and (6) reducing the metal value to the elemental metal by cathodically electroplating from the solution of the water-soluble salt.

2. The process of claim 1, wherein the sulfide iron ore comprises iron pyrrhotite.

3. The process of claim 1, wherein the sulfide iron ore comprises iron pyrite.

4. The process of claim 1, wherein air is injected into the mixed ores during roasting.

5. The process of claim 1, wherein air is injected into the leach solution during leaching.

6. The process of claim 1 wherein the individual metal value is extracted by a liquid ion exchange medium.

7. The process of claim 6 comprising contacting the aqueous leach solution with a liquid ion exchange medium selective for the metal, separating the medium from the leach solution and stripping the metal value from the medium with an aqueous stripping liquid.

8. The process of claim 6 wherein the medium comprises a metal extractant selected from the group consisting of alpha-hydroxyoximes and 8-hydroxyquinolines.

9. The process of claim 7 wherein the metal extractant is dissolved in a water-immiscible organic liquid solvent.

10. The process of claim 1 wherein the roasting is carried out at a temperature of at least about 350° C.

11. The process of claim 1 wherein the roasting is carried out in a fluidized bed.

12. The process of claim 1 wherein the nodule ore and the sulfide ore are both comminuted before being roasted.

13. The process of claim 1 wherein the leach water has a pH of not greater than about 3.

14. A process for separating metal values from ocean floor nodule ores, the ore comprising as primary components the oxides of manganese and of iron and as secondary components compounds of copper, cobalt and nickel while simultaneously separating metal values from iron sulfide ores comprising as a primary component a sulfide of iron and as secondary component a sulfide of a non-ferrous metal, the process comprising the steps of (1) mixing the nodule ore and iron sulfide ore; (2) roasting the mixed ore in the presence of oxygen so as to form as reaction products the water soluble sulfate salts of divalent manganese, nickel, cobalt and copper and of the non-ferrous metal present in the sulfide ore and an insoluble iron compound; (3) leaching the reacted mixed ores with water to form an aqueous pregnant leach solution comprising the sulfates of divalent manganese, copper, nickel and cobalt from the nodule ore and the non-ferrous metal from the sulfide ore; (4) separating the pregnant leach solution from any insoluble residue of the ores including the insoluble iron compound to form a pregnant leach solution of the mixed soluble sulfate salts.

15. The process of claim 14 comprising in addition (5) separating individual metal values in the pregnant leach solution by subjecting said leach solution to a liquid ion exchange medium and stripping individual metal values therefrom, resulting in separate aqueous solutions of soluble copper salt, nickel salt, cobalt salt and manganese salt; (6) reducing the copper to copper metal by cathodically electroplating the aqueous solution of copper salt; (7) reducing the manganese salt, nickel salt and cobalt salt to elemental manganese, cobalt and nickel by cathodically electroplating respectively from an aqueous solution of the manganese salt, nickel salt and cobalt salt.

References Cited

UNITED STATES PATENTS 3,169,856  2/1965  Mero ---------------- 75—119

JOHN H. MACK, Primary Examiner

R. L. ANDREWS, Assistant Examiner

U.S. Cl. X.R.

204—108, 112; 75—101 BE, 117, 119, 121; 423—140

PO-1050
(5/69)

UNITED STATES PATENT OFFICE
CERTIFICATE OF CORRECTION

Patent No. 3,809,624           Dated  May 7, 1974

Inventor(s) W. S. Kane, et al.

It is certified that error appears in the above-identified patent and that said Letters Patent are hereby corrected as shown below:

Column 4, line 62, please correct "seriatum" to read --seriatim--

Column 11, line 44, please correct "$CoSO_c$" to read --$CoSO_4$--

In column 15, lines 36 and 37 (Claim 1, lines 9 and 10), column 15, line 56 (Claim 2, line 1) and column 15, line 58 (Claim 3, line 1), please correct "sulfide iron" to read --iron sulfide--

In column 16, following line 54, and immediately prior to "References Cited", please insert the following additional claim:

--16. The process of Claim 14, wherein the roasting of the mixed ore is carried out at a temperature in the range of from about 350° to about 600°C.--

Signed and sealed this 1st day of April 1975.

(SEAL)
Attest:

RUTH C. MASON
Attesting Officer

C. MARSHALL DANN
Commissioner of Patents
and Trademarks